UNITED STATES PATENT OFFICE.

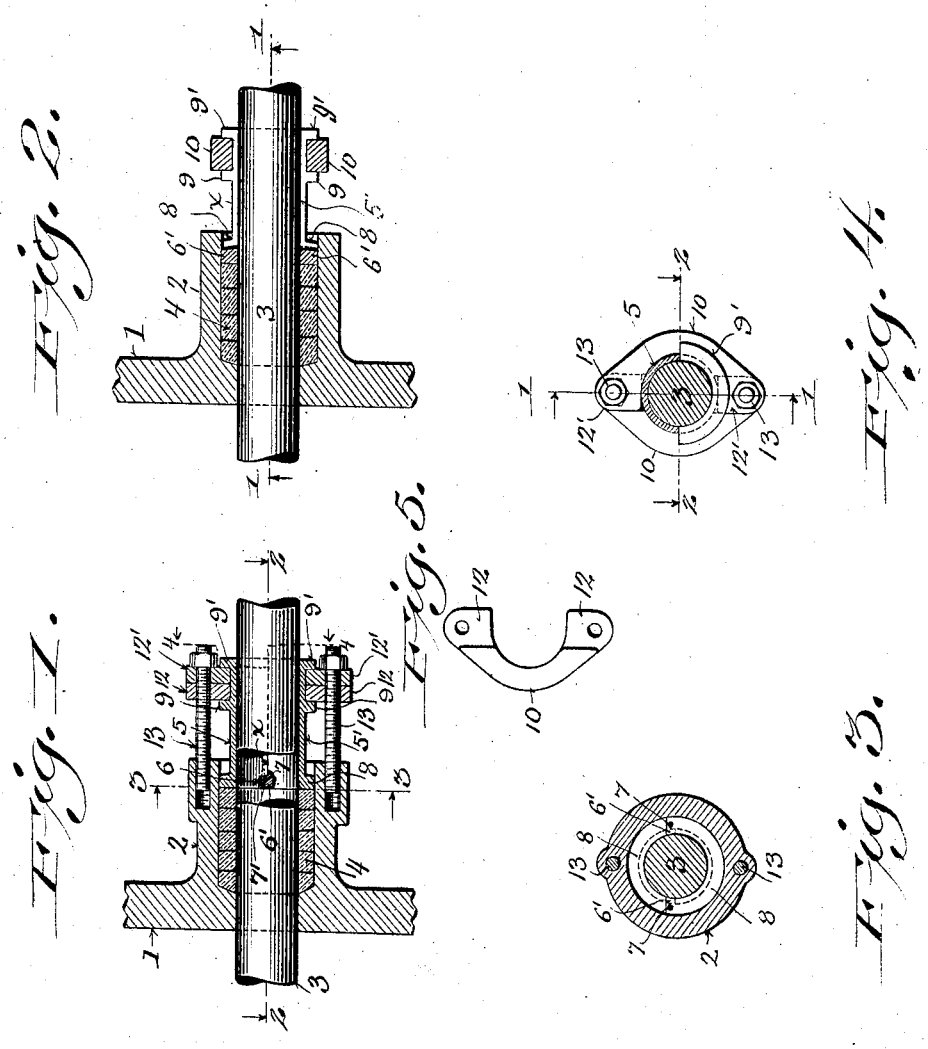

WILEY W. YOUNG, OF MILWAUKEE, AND AUGUST A. COOPER, OF BUTLER, WISCONSIN.

STUFFING-BOX.

1,057,201. Specification of Letters Patent. Patented Mar. 25, 1913.

Application filed January 9, 1913. Serial No. 740,918.

*To all whom it may concern:*

Be it known that we, WILEY W. YOUNG and AUGUST A. COOPER, both citizens of the United States, and residents of Milwaukee, in the county of Milwaukee and State of Wisconsin, and of Butler, in the county of Milwaukee and State of Wisconsin, respectively, have invented certain new and useful Improvements in Stuffing-Boxes; and we do hereby declare that the following is a full, clear, and exact description thereof.

The primary object of our invention is to provide a simple, economical and effective fitting for stuffing-boxes to be used in forming a tight joint between a fixed head and a movable piston, the arrangement and construction being such that the several detachable fittings can be dismantled from about the piston or rod without removal of the latter from its head or cylinder, whereby any or all of such fittings can be quickly replaced in case of repairs and when so replaced the several parts form a compact, rigid and tightly packed joint.

With the above object in view the invention consists in certain peculiarities of construction and combination of parts as set forth hereinafter with reference to the accompanying drawings and subsequently claimed.

In the drawings Figure 1 represents a longitudinal sectional view of a fragment of a cylinder head having a reciprocative piston-rod mounted therein and provided with a fitting embodying the features of our invention, parts of the same being broken away to more clearly illustrate certain structural features with the plane of the section indicated by line 1—1 of Fig. 4; Fig. 2, a similar sectional view, the section being indicated by line 2—2 of Fig. 4; Fig. 3, a detailed cross-section of the fitting, the section being indicated by line 3—3 of Fig. 1; Fig. 4, a detailed cross-section indicated by line 4—4 of Fig. 1, and Fig. 5, a detailed face view of a semicircular collar constituting one of the fitting members.

Referring by characters to the drawings, 1 represents a portion of the head of a cylinder that may form part of a compressor or prime mover, the head being provided with the ordinary type of stuffing box 2 into which is fitted a piston-rod 3. The stuffing-box is also provided with the usual packing 4 that is fitted about the rod. The packing is held in place by a follower or gland that is formed in two semicircular sections 5 and 5', the same being split upon a longitudinal division line $x$ as shown. The member 5' of the gland at its division line is provided with a rectangular recess 6 adjacent to one end for the reception of a rectangular lug 6' that projects from the other member, whereby said members are interlocked, there being a dowel pin 7 extending from one of the recess walls 6 that is arranged to be fitted into a dowel-receiving aperture 7', which aperture is formed in the projecting lug 6'. The inner end of the gland is also provided with a packing ring engaging flange 8 and a pair of annular shoulders 9, 9', that are spaced adjacent to its outer end, which shoulders are spaced apart to form an annular groove, the shoulders of the split members being arranged to coincide when said members are assembled to form rings.

Fitted between the shoulders 9 and 9' are a pair of semicircular collars 10, 10', which collars are provided with ears 12, 12, 12', 12', respectively, that are of an approximate thickness equal to one-half of the collar thickness in cross-section, the said ears being apertured and when assembled overlap each other, whereby their apertures coincide to form seats for retaining bolts 13, 13, which bolts are in threaded union with the stuffing-box as best shown in Fig. 1.

From the foregoing description it is apparent that should it be desirable to renew or tighten the packing between the piston-rod and stuffing box that the retaining bolts can be manipulated for effecting the desired result and should it be desired to renew the gland or any part of the removable fixtures constituting the joint, it is also apparent that the entire mechanism can be disorganized by removing the retaining bolts 13. Should the retaining bolts be withdrawn from the apertured ears of the semicircular collars, the said collars can be readily removed and thereafter the two-part gland can also be removed from about the shaft and a new two-part gland substituted therefor or a single section of said gland, which may have become worn or broken, can be thus replaced. After replacing of the gland members in their interlocked position the semicircular collars are then inserted between the shoulders 9 and 9' and secured by adjusting the bolts to the stuffing-box and thus the gland in its entirety is completely and readily inserted in place in a few moments. It is also apparent that should one of the collar members become broken or worn that similar members can be substituted for those broken in the same manner as described in connection with the gland portion. Attention is also called to the fact that owing to the stepped or interlocked longitudinal joint between the follower members 5 and 5' that said joint is practically steam-tight and that the members are held securely together at their inner ends by the dowel-pin and that the outer ends of said members are held securely together by engagement with the semicircular collars.

In practice it has been found that should a unitary gland become worn or broken much annoyance and loss of time and expense will result, due to the fact that should the gland, constituting part of a prime mover be broken, such breakage would necessitate a shut-down and in order to renew the broken part, the shaft or piston-rod must be dismantled so as to insert a unitary gland upon the end of said shaft, in order to get it into proper position. With our apparatus these difficulties are entirely overcome and any one or all of the parts can be quickly and readily renewed.

We claim:

1. A fitting for stuffing-boxes comprising a longitudinally divided gland having an annular shoulder extending from its face, means for interlocking the split gland members, and a pair of semi-circular collars engageable with the gland shoulder, the pair of collars being provided with registered bolt receiving ears.

2. In a joint for a piston and cylinder head, the head being provided with a stuffing box extending therefrom; the combination of a longitudinally split gland having a pair of annular shoulders extending therefrom to form a circular recess at one end, a pair of semicircular collar members engageable with the gland between the shoulders, apertured ears extending from the collar members, and retaining bolts carried by the stuffing box engageable with the ear apertures.

3. A fitting for stuffing-boxes comprising a longitudinally split gland, one of the split members being provided with an end recess, the opposite member being provided with a lug engageable with the recess, a pin for locking the lug and recess together, a shoulder extending from the gland member adjacent to the outer end, and a bolt-receiving collar engageable with the gland shoulder.

In testimony that we claim the foregoing we have hereunto set our hands at Butler in the county of Milwaukee and State of Wisconsin in the presence of two witnesses.

WILEY W. YOUNG.
AUGUST A. COOPER.

Witnesses:
V. T. HURST,
WM. F. MAHAN.